Figure 1:
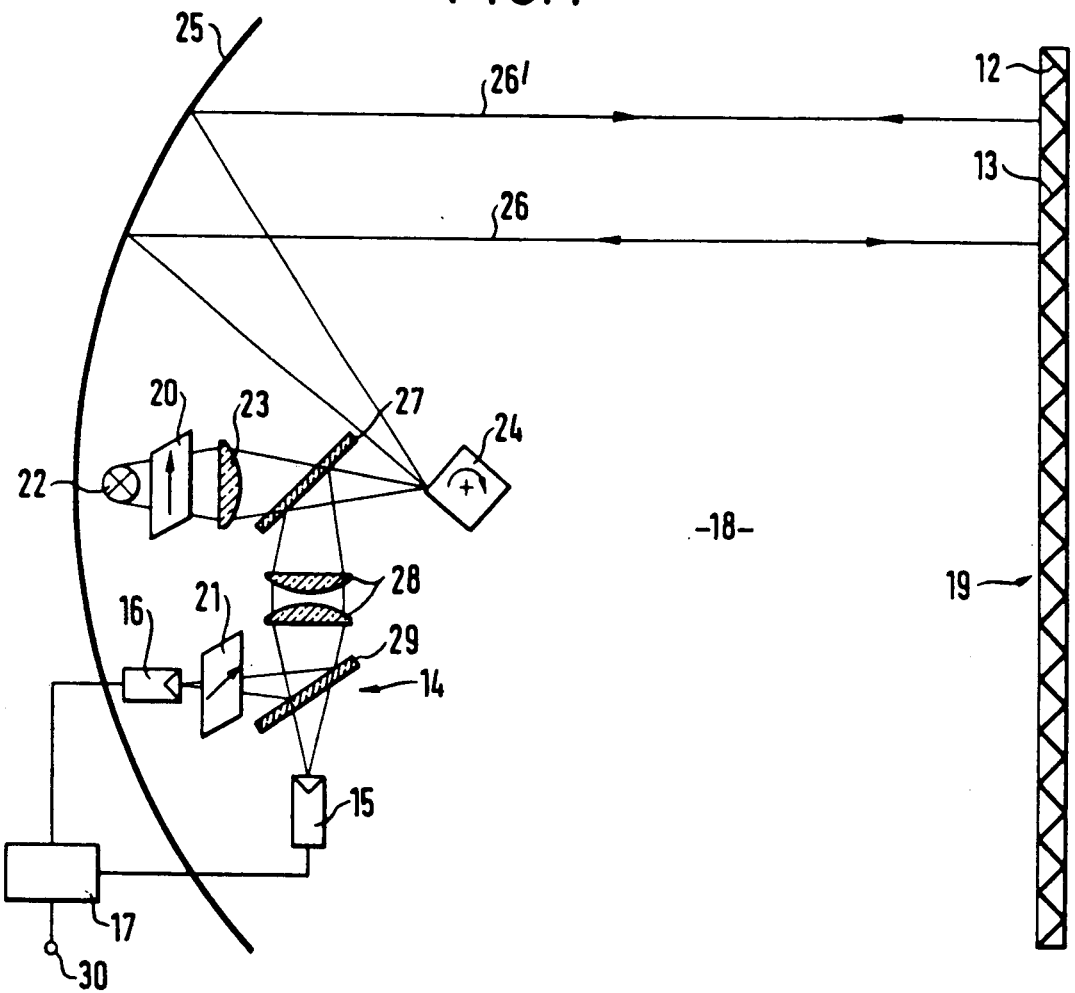

United States Patent [19]

Ball

[11] Patent Number: 5,008,530

[45] Date of Patent: Apr. 16, 1991

[54] AUTOCOLLIMATION LIGHT CURTAIN

[75] Inventor: Hans-Klaus Ball, Freiburg/Brsg., Fed. Rep. of Germany

[73] Assignee: Erwin Sick GmbH Optik-Elektronik, Waldkirch, Fed. Rep. of Germany

[21] Appl. No.: 129,280

[22] Filed: Dec. 7, 1987

[30] Foreign Application Priority Data

Dec. 9, 1986 [DE] Fed. Rep. of Germany ....... 3641926

[51] Int. Cl.$^5$ .................... G01V 9/04; G08B 13/18
[52] U.S. Cl. .................. 250/221; 250/225; 250/226; 340/556
[58] Field of Search .............. 340/555, 556, 557; 250/225, 226, 221

[56] References Cited

U.S. PATENT DOCUMENTS

| | | | |
|---|---|---|---|
| 3,858,043 | 12/1974 | Sick et al. | 340/555 |
| 4,310,836 | 1/1982 | Stanzani | 340/556 |
| 4,339,660 | 7/1982 | Buehholz et al. | 250/221 |
| 4,546,246 | 10/1985 | Bechtel | 340/556 |
| 4,734,575 | 3/1988 | Wagli et al. | 250/225 |

FOREIGN PATENT DOCUMENTS 1436953  5/1976  United Kingdom ................ 340/556

Primary Examiner—Edward P. Westin
Assistant Examiner—Eric F. Chatmon
Attorney, Agent, or Firm—Townsend and Townsend

[57] ABSTRACT

An autocollimation light curtain comprises a light source which directs a light beam onto a scanning device which scans the light beam so that it is continuously displaced parallel to itself, thus forming a light curtain which is directed through a monitoring region. A reflector is provided at the end of the monitoring region and is subdivided in the scanning direction into a plurality of fields of two types which alternate with each other. Light reflected at the reflector is directed back to a light receiving system comprising first and second photodetectors. The two types of fields of the reflector have characteristics which influence the spectral range and/or the state of polarization of the incident light. In the light receiving arrangement one photoreceiver is filtered so that it receives only light reflected from the one type of field, but not light from the other type of field, whereas the other photoreceiver responds to all the light reflected back from the reflector. Thus one photoreceiver produces a dc signal and the other an alternating signal and a free monitoring region is only signalled when both the dc signal and the alternating signal are present.

6 Claims, 1 Drawing Sheet

AUTOCOLLIMATION LIGHT CURTAIN

The invention relates to an autocollimation light curtain comprising a light source; a light beam generating optical system; a light deflecting device such as a mirror wheel which receives the light beam; a reflector at the end of a monitoring region which is periodically scanned by the light beam and is subdivided in the scanning direction into a plurality of fields of two types which alternate with each other; and also a light receiving system which receives a received light beam reflected out of the beam path in front of the light deflecting device and which has a photoreceiver for receiving the light reflected back from the reflector when the monitored region is free.

In order to protect working people from dangerous machines use is made nowadays of light grids and light curtains, punches or robots, which stop or prevent the dangerous movement of the machine on intervention of the operator for example with presses.

The modulation of the incident dc light obtained by splitting the reflector up into different fields makes it more difficult to manipulate the light curtain by the introduction of reflective material into the monitoring region. In an autocollimation light curtain of the initially named kind, as known from DE-AS 1 261 025 the reflector is divided into reflecting and non-reflecting strips. With this arrangement it is unfavourable that an interruption of the monitoring region occurs in the zone of the non-reflecting strips.

The principal object underlying the present invention is to provide an autocollimation light curtain of the initially named kind which ensures gapless detection of the whole monitoring region while precluding manipulation through reflected material introduced into the monitored region, with the autocollimation light curtain thus also being suitable for stringent security requirements.

In order to satisfy this object the invention provides that the two alternating types of fields of the reflector have characteristics which influence the spectral range and/or the state of polarisation of the incident light; that the light receiving arrangement includes a second photoreceiver which is so filtered that it receives only light reflected from the one type of field but not light from the other type of field, whereas the first photoreceiver responds to all light reflected back from the reflector; and that both photoreceivers are connected to a logic circuit which only signals freedom of the monitoring region when the second photoreceiver transmits an alternating signal and the first photoreceiver transmits a dc signal.

As a result of this construction easy manipulation of the autocollimation light curtain by the introduction of reflective material into the monitoring region is prevented and it is ensured that the entire monitoring region is detected without gaps. Accordingly non-reflective materials which have the same or a smaller width than the fields and which are aligned with the latter are in particular also detected.

Ready manipulation of the autocollimation light curtain is avoided in that the light reflected back by the reflector is coded in a suitable manner and this coding is decoded and recognised in the light receiving arrangement. As it is extremely improbable that the operator who does not even know the code can bring a correspondingly coded reflective article into the monitoring region, and as any non-reflecting material is reliably detected over the whole monitoring region, the security of the autocollimation light curtain against non-permissible manipulation is very great.

Whereas the main claim proposes a particularly simple and easy to realise coding of the light reflected from the reflector any type of coding of the light reflected back from the reflector can basically be used which can be recognised at the receiver side.

In a preferred embodiment a balance circuit is preferably provided at the first photoreceiver which balances out small differences in level of the two signals reflected from the fields.

In a particularly preferred embodiment all fields are of the same width.

In order not to impair the recognition sensitivity of the light curtain provision should further be made that the width of the fields in the scanning direction is greater than the required resolution of the light curtain. The width of the fields is in particular substantially greater than the extent of the scanning light bead on the reflector in the scanning direction.

A first practical embodiment is characterised in that the reflector is a triple reflector with alternately non-metallised and metallised fields, that a polariser is provided for linear polarisation of the light of the light source and that an analyser crossed relative to the polariser is provided in front of the second photoreceiver.

Another possibility which can be realised without difficulty consists in that at least one type of field is coloured and in that a colour filter complementary to this colouring is arranged in front of the second photoreceiver.

The invention will now be described in the following by way of example only and with reference to the drawings in which are shown:

FIG. 1 a schematic sideview of an autocollimation light curtain and

Figure 2:
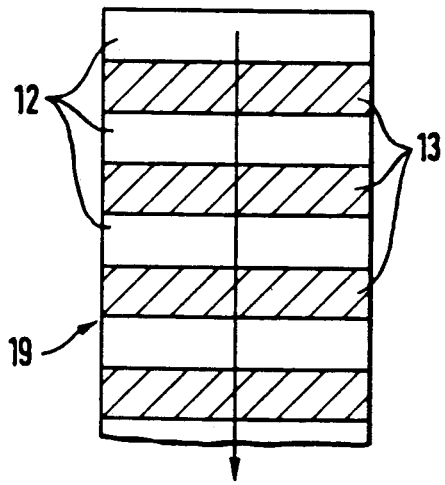

FIG. 2 a partial plan view of a retroreflector for the autocollimation light curtain of FIG. 1.

In accordance with FIG. 1 the light transmitted from a light source 22 is transmitted via a linear polariser 20 to an optical system 23 which concentrates a directed light beam onto a mirror wheel (24). The mirror wheel 24 is arranged at the focal point of a strip-like concave mirror 25 which receives the light reflected from the mirror wheel 24, which rotates in the direction of the arrow, and transmits it as a parallel scanning beam 26, 26' into a monitoring region 18. A reflector constructed as a strip like retroreflector 19 is arranged at the end of the monitoring region 18 and reflects the incident light back on itself to the mirror wheel 24 from where it passes to a partially transmitting mirror 27 arranged in the transmission beam path. The partially transmitting mirror 27 reflects out a part of the received light and concentrates it via an optical receiving system 28 onto a first photoreceiver 15. A further semi-permeable mirror 29 is arranged between the optical receiving system 28 and the first photoreceiver 15 and concentrates a part of the received light onto a second photoreceiver 16 via an analyser 21 crossed relative to the polariser 20.

The two photoreceivers 15, 16 are connected to a logic circuit 17 which has a monitoring output 30.

As seen in FIG. 2 the reflector 19 is divided into a plurality of sequential fields 12, 13 which follow one another in the scanning direction as indicated by the arrow. The fields consist of triple reflectors which are however not metallised in the fields 12 but metallised in the fields 13. In this manner the fields 12 have a depolarising characteristic so that the polarisation of the transmitted light beams provided by the polariser 20 is partly overcome by reflection at the fields 12.

In contrast the light reflected at the metallised fields 13 retains its state of polarisation. In this manner the first photoreceiver 15 receives the light reflected from both fields 12, 13 in undisturbed manner so that a dc voltage signal appears at its output, providing the monitoring region 18 is free of obstacles. Certain small distinctions in level between the two signals originating from the fields 12 and 13 can be overcome by a balance circuit. The light which reaches the second photoreceiver 16 is however differentially affected by the analyser 21 depending on whether it comes from the fields 12 or the fields 13. The light coming from the fields 12 passes in part through the analyser 21 because it is depolarised. The light coming from the fields 13 is however not transmitted by the analyser 21, so that during the periods when the scanning light beam sweeps over the fields 13 no received signal appears at the output of the second photoreceiver 16. Taken as a whole, the second photoreceiver thus delivers an alternating signal to the logic circuit 17 when the monitoring region is free of obstacles.

When the monitoring region 18 is interrupted the two photoreceivers 15, 16 no longer provide an output signal so that a machine stop signal appears at the monitoring output 30.

If a strongly reflecting object is introduced into the monitoring region 18 then the second photoreceiver 16 no longer delivers the alternating signal characteristic for the reflector 19 and this is recognised by the logic circuit 17. Hereupon a warning or machine stop signal is likewise transmitted at the monitoring output 30. This also occurs if a part of the body of a person wearing light clothing enters into the monitoring region 18.

The essence of the invention thus lies in the fact that when the monitoring region 18 is free of obstacles the retroreflector 19 reflects a light beam which is dynamically coded in a special manner with respect to its state of polarisation or its spectral range and in the fact that this coding is evaluated in a light receiving arrangement 14. A free monitoring region 18 is only signalled by the logic circuit 17 when this predetermined time coding appears in the received light, otherwise it is not signalled.

I claim:

1. Autocollimation light curtain comprising a light source; a light beam generating optical system; a light deflecting device such as a mirror wheel which receives the light beam, a reflector at the end of a monitoring region which is periodically scanned by the light beam and is subdivided in the scanning direction into a plurality of fields of two types which alternate with each other; and also a light receiving system which receives a received light beam reflected out of the beam path in front of the light deflecting device and which has a photoreceiver for receiving the light reflected back from the reflector when the monitored region is free of obstacles, characterised in that the two alternating types of fields (12, 13) of the reflector (19) have characteristics which influence the spectral range and/or the state of polarisation of the incident light; in that the light receiving arrangement (14) includes a second photoreceiver (16) which is so filtered that it receives only light reflected from the one type (12) of field but not light from the other type (13) of field, whereas the first photoreceiver responds to all light reflected back from the reflector (19); and in that both photoreceivers (15, 16) are connected to a logic circuit (17) which only signals that the monitored region is free of obstacles when the second photoreceiver (16) transmits an alternating signal and the first photoreceiver (15) transmits a dc signal.

2. Autocollimation light curtain in accordance with claim 1, characterised in that a balance circuit is provided at the first photoreceiver (15) which balances out small differences in level of the two signals reflected from the fields (12 and 13) respectively.

3. Autocollimation light curtain in accordance with claim 1, characterised in that all fields (12, 13) are of the same width.

4. Autocollimation light curtain in accordance with claim 1, characterised in that the widths of the fields (12, 13) in the scanning direction is larger than the required resolution of the light curtain.

5. Autocollimation light curtain in accordance with claim 1, characterised in that the reflector (19) is a triple reflector with alternating non-metallised and metallised fields (12, 13); that a polarizer (20) is provided for linear polarization of the light of the light source (22); and in that an analyser (21) crossed relative to the polarizer (20) is arranged in front of the second photoreceiver (16).

6. Autocollimation light curtain in accordance with claim 1, characterised in that one type of field (12, 13) is coloured; and in that a colour filter complementary to this colouring is arranged in front of the second photoreceiver (16).

* * * * *